(No Model.)
C. V. PLEUKHARP.
CASTER.
No. 348,052. Patented Aug. 24, 1886.
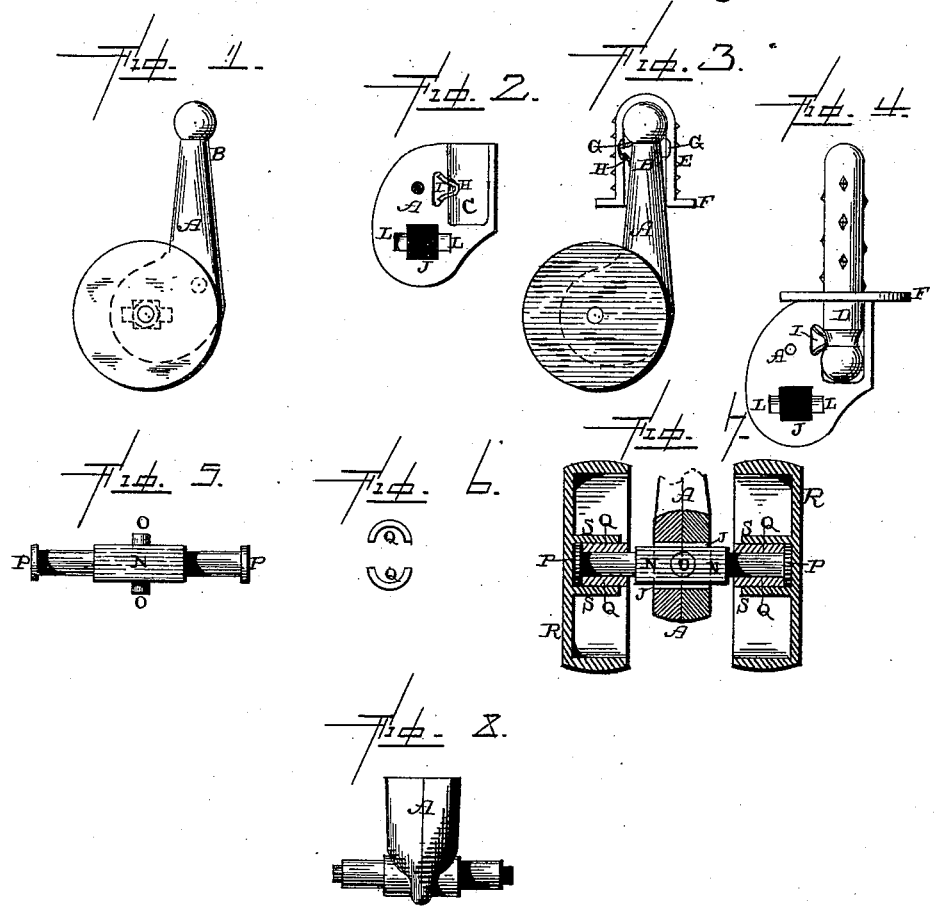
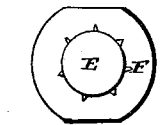
Fig. 9.
Witnesses,
L. F. Gardner
A. S. Pattison
Inventor
C. V. Pleukharp,
per
J. A. Lehmann,
Atty.

UNITED STATES PATENT OFFICE.

CHARLES V. PLEUKHARP, OF COLUMBUS, OHIO.

CASTER.

SPECIFICATION forming part of Letters Patent No. 348,052, dated August 24, 1886.

Application filed June 14, 1886. Serial No. 205,142. (No model.)

*To all whom it may concern:*

Be it known that I, CHARLES V. PLEUK-HARP, of Columbus, in the county of Franklin and State of Ohio, have invented certain new and useful Improvements in Casters; and I do hereby declare the following to be a full, clear, and exact description of the invention, such as will enable others skilled in the art to which it pertains to make and use it, reference being had to the accompanying drawings, which form part of this specification.

My invention relates to an improvement in casters; and it consists in, first, a wheel-frame or saddle, which is made in two parts and provided with recesses and openings, in combination with an axle which passes through the two parts of the frame, and which is held in place between them; second, the combination of the axle, a sleeve placed upon the axle, and the roller provided with a ring, which is forced over or shrunk upon the sleeve.

The object of my invention is to provide a two-wheel caster in which the frame is made in two parts, which are secured together for the purpose of holding the spindle or the stem between them, to connect the axle to the frame in such a manner as to give the caster an oscillating movement, and to secure the roller to the axle without the use of rivets or other fastenings, such as are now in general use.

Figure 1 is a side elevation of a caster, in which the frame is made of two parts and provided with a stem or projection. Fig. 2 is a similar view of one of the parts of the frame, provided with a socket to receive the lower end of the stem or projection. Figs. 3 and 4 show detached views of the caster-frames provided with springs, and the manner of attaching them to the sockets or stems. Fig. 5 is a detached view of one of the axles. Fig. 6 is an end view of one of the hubs. Fig. 7 is a horizontal section taken through the center of the rollers. Fig. 8 shows a portion of the two-part frame, having the axle formed as a part of it. Fig. 9 shows the shape of the fillet.

A A represent the two parts of the frame, which are to be riveted together, and which may either have the stem B, formed as a part thereof, or provided with a socket, C, to receive the lower end of a stem, D, as may be preferred. Where the stem B is formed as part of the frame, it is to be used in connection with the socket E, which may be made in either one or two parts, and which are provided with external spurs, which may be placed spirally or not, as may be preferred. Formed as a part of this socket is a fillet or flange, F, which has two or more parallel sides, to which a wrench or other tool can be applied for the purpose of unscrewing the sockets after they have been driven, forced, or screwed in position. In the upper portion of this socket is made an internal groove, G, into which the projecting bent spring H is made to catch for the purpose of holding the caster in the socket. This spring is placed in a suitably-shaped recess, I, which is made either in the inner side of the stem itself or the inner side of the frame, according to the construction which is employed. When this stem B is forced into the socket E, the projecting point H of the spring is forced backward until it reaches the groove G, and then the point of the spring snaps out into said groove, so as to hold the two parts together. In case a frame is used which is provided with the socket C, the spring H will be placed in a recess, I, as shown, and then the stem, which is provided with a head upon its lower end, the spurs, and the fillet or flange F, are used. This stem can then be forced into the article of furniture and the frame will be passed over the end of the stem, the spring being made to snap behind the head, so as to connect the parts together.

Through both parts of the frame A is made a suitable opening, J, and communicating with this opening, upon opposite sides thereof, are the rests or bearings L. Before the two parts of the frame are put together and riveted the axle N is passed through the openings J, and its trunnions O made to fit in the bearings L, prepared to receive them. The openings for the bearings are made slightly larger than is absolutely necessary, and hence the spindle has an oscillating movement. Upon each end of the axle N is formed a flange, P, which prevents the two parts of the sleeve Q from slipping off. These two parts are applied to the ends of the axle, and then the roller R, having the internal ring, S, and which has been previously heated to a suitable degree, is passed over the end of the axle and allowed to cool. In cooling, this ring S contracts upon the two parts of the sleeve and binds them permanently upon the axle. The roller is connected to the sleeve by contracting upon it, and the sleeve is prevented from coming off the end of the axle by the flange P, against which it abuts. No rivets or other fastenings, which usually have to be applied, are used in fastening the roller in position, and for this reason the method here shown and described is much simpler, cheaper, and more secure in every way.

In case it should be desired to have the axle perfectly rigid, each part of it may be cast as a part of the frame itself, instead of being passed through the two parts and held by them. Where the axle is made a part of the frame, the frame will preferably be provided with a socket to receive the end of a stem, D, or, if so preferred, the stem may be formed as part of the frame itself.

Although the frames, as here shown and described, are made in two parts and then riveted together, it is not necessary that the vertical line of separation between the two parts should be exactly in the center.

Having thus described my invention, I claim—

1. A frame for a two-wheel caster, which is made in two parts, in combination with an axle which is provided with trunnions, and which is held in position between the two parts of the frame, substantially as set forth.

2. The combination of the frame, the axle provided with a flange upon each end, the two-part sleeve, and the caster-wheel provided with a ring to catch over the sleeve, substantially as described.

In testimony whereof I affix my signature in presence of two witnesses.

CHARLES V. PLEUKHARP.

Witnesses:
　RALPH REAMER,
　GEORGE S. BEESON.